United States Patent [19]

Buysch et al.

[11] Patent Number: 5,614,616
[45] Date of Patent: Mar. 25, 1997

[54] PROCESS FOR THE PRODUCTION OF POLYSACCHARIDES

[75] Inventors: Hans-Josef Buysch, Krefeld; Klaus Szablikowski, Walsrode; Jörn Breckwoldt, Rothenburg, all of Germany

[73] Assignee: Wolff Walsrode Aktiengesellschaft, Walsrode, Germany

[21] Appl. No.: 746,397

[22] Filed: Aug. 16, 1991

[30] Foreign Application Priority Data

Aug. 23, 1990 [DE] Germany .................. 40 26 617.6

[51] Int. Cl.$^6$ .................................................. C08B 11/15
[52] U.S. Cl. ........................ 536/18.7; 536/30; 536/31; 536/43; 536/44
[58] Field of Search .................. 536/18.7, 30, 43, 536/44, 31

[56] References Cited

U.S. PATENT DOCUMENTS

| | | | |
|---|---|---|---|
| 3,567,360 | 3/1968 | Pierce, Jr. et al. ............ | 536/43 |
| 4,731,162 | 3/1988 | Solarek et al. ............... | 536/43 |
| 4,988,806 | 1/1991 | Gruning et al. ............... | 536/30 |

FOREIGN PATENT DOCUMENTS 2219587  12/1989  United Kingdom.

*Primary Examiner*—Jeffrey C. Mullis
*Attorney, Agent, or Firm*—Sprung Horn Kramer & Woods

[57] ABSTRACT

Polysaccharides corresponding to formula (I)

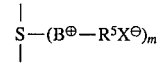

in which
  S is a recurrent monosaccharide unit and
  B is a group of formula (Ia) attached to the monosaccharide unit S by an O atom

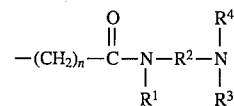

are prepared by reaction of polysaccharides with an alkyl halide corresponding to formula (II)

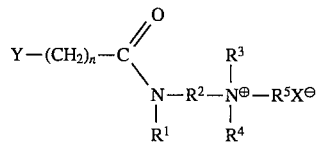

7 Claims, No Drawings

PROCESS FOR THE PRODUCTION OF POLYSACCHARIDES

This invention relates to a process for the production of cationic polysaccharides.

Cationic polysaccharides are highly regarded as auxiliaries in paper manufacture, as starting products in the production of highly active filter materials which are used in the medical field and in the food industry and as additives for hygienic and cosmetic cleansing and care preparations. Basic polysaccharides are used inter alia as ion exchangers (U.S. Pat. No. 4,199,485) for the production of acid-soluble polysaccharides (U.S. Pat. No. 2,623,041) and as starting products for the synthesis of cationic polysaccharides (cf. U.S. Pat. No. 2,768,162). Their activity is generally greater, the more cationic groups they contain.

Accordingly, it would be desirable to be able to substitute polysaccharides to a more or less high degree in accordance with the particular requirements.

At a very early stage, cellulose sulfonates were reacted with amines in order to obtain N-containing celluloses. However, the degrees of substitution obtained were inadequate (for example 0.8% by weight N; cf. Angew. Chem. 39, 1509 to 36 (1926)) and the yields were poor (cf. J. Amer. Chem. Soc. 63, 1688 to 1691).

After alkylation for the purpose of cationization, the cationized cellulose always has to be subjected to elaborate purification and reprecipitation process to separate it from the cationic polyethers (see Examples 1 to 3 of U.S. Pat. No. 3,472,840).

A process for the production of derivatives of CMC with quaternary ammonium is known from DE-PS 3 820 031. This known process is characterized in that a) an alkali metal salt of carboxymethyl cellulose is reacted with alkyl halides, particularly methyl chloride, to form the ester of carboxymethyl cellulose, b) amines corresponding to the following general formula

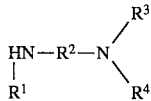

are added to the resulting carboxymethyl cellulose ester and c) finally, the aminoamido celluloses are quaternized with generally known alkylating agents.

However, this known process is attended by some serious disadvantages, namely:

1. Only those cellulose ethers which bear the carboxymethyl substituent (CMC, CMHEC) can be reacted by the process.

2. The process is not economical. The three-stage synthesis is very time-consuming (see Example 1a: reaction time 21 h) and involves two purification steps.

3. The degree of substitution of cationic groups cannot be established as required and is dependent upon the carboxymethyl cellulose used. Partial conversion of the carboxylate groups into quaternary ammonium groups is not possible, giving products containing both cationic and anionic groups which, as already known, leads to the formation of inner salts so that the products become insoluble in water (ionic crosslinking).

4. The esterification of the carboxymethyl cellulose is not clear-cut. The methyl chloride decomposes under the reaction conditions mentioned with formation of methanol and hydrochloric acid. As a result of this decomposition, the process is accompanied by a whole number of secondary reactions involving the polymer, ultimately leading to water-insoluble products (see Comparison Example).

5. As a result of the secondary reaction and the reaction parameters, the quaternary polymer has a much lower viscosity than the carboxymethyl cellulose used (see Example 3 of the patent).

The problem addressed by the present invention was to provide cationic polysaccharides having a clear-cut, flexibly adjustable substitution and as high a degree of substitution as possible by clear-cut reactions using inexpensive reagents.

The present invention relates to a process for the production of polysaccharides corresponding to formula (I)

by reaction of polysaccharides based on recurring units S with an alkyl halide corresponding to formula (II)

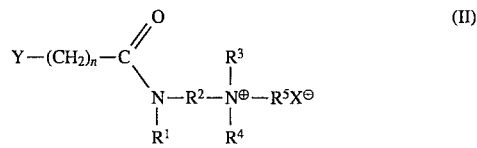

in which

S is a monosaccharide unit and

B is a group of formula (Ia) attached to the monosaccharide unit S by an O atom

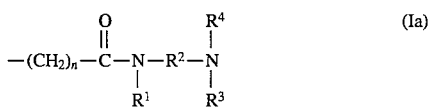

n=an integer of 1 to 6, $R^1$=H, $C_{1-4}$ alkyl, $R^2$=an alkylene radical which may interrupted by at least one O or N atom, $R^3,R^4$=an alkyl, aralkyl or aryl radical, an alkyl radical which may be interrupted by at least one heteroatom, m=a number of 0.05 to 3.0, $R^5$=an alkyl radical optionally containing an olefinic double bond or an O atom or an aralkyl radical, Y=Cl, Br, $X^{\ominus}$=an anion or $R^3$ and $R^4$ together with the common N atom form a ring optionally containing another heteroatom.

In one preferred embodiment, $R^1$=H, $CH_3$ $R^2$=—$CH_2CH_2$—, —$(CH_2)_3$—, —$(CH_2)_4$—, —$(CH_2)_6$—,

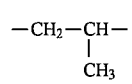

—$(CH_2)_3$—O—$(CH_2)_2$—, —$(CH_2)_2$—O—$(CH_2)_2$—, $R^3$=CH$_3$, C$_2$H$_5$, C$_3$H$_7$, C$_4$H$_9$,

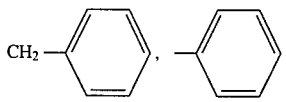

$R^4$=CH$_3$, CH$_2$CH$_2$OH, CH$_2$CH$_3$, CH$_2$—CH$_2$—O—CH$_3$
or
$R^3$,$R^4$ together with N atom form the group

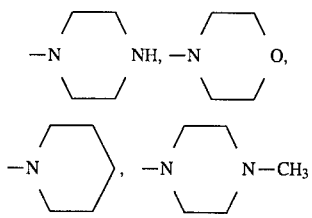

$R^5$=CH$_3$, CH$_2$CH$_3$, CH$_2$—CH=CH$_2$,

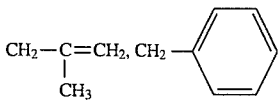

CH$_2$—CH$_2$OH
$X^\ominus$=Cl$^\ominus$, Br$^\ominus$, SO$_4$Me$^\ominus$, SO$_4$Et$^\ominus$ toluene sulfonate, methane sulfonate, phosphate, sulfate.
In a particularly preferred embodiment,
$R^1$=H,
$R^2$=—(CH$_2$)$_2$—, —(CH$_2$)$_3$—,
$R^3$,$R^4$=CH$_3$, CH$_2$CH$_3$
$R^5$=CH$_3$, CH$_2$—CH=CH$_2$,

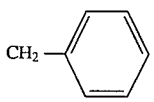

CH$_2$CH$_2$OH, CH$_2$CH$_3$,
$X^\ominus$=Cl$^\ominus$, SO$_4$Me$^\ominus$, SO$_4$Et$^\ominus$.

The alkyl halides corresponding to formula II have never been described before. Accordingly, the present invention also relates to compounds corresponding to formula II. The substituents apart from Y have the same meaning as in the above definition of formula Ia. The same also applies to the preferred substituents. Y=Cl, Br.

The compounds corresponding to formula II may readily be obtained by conventional methods known to the expert.

Starting products for polysaccharides corresponding to formula (I) are, preferably, polyglycosans, such as cellulose, the various derivatives of cellulose, such as methyl cellulose, or mixed cellulose ethers, such as methyl hydroxyethyl celluloses, carboxymethyl celluloses, their various salts with sodium, potassium or ammonium ions; starch, dextrins, glycogen; polyfuctosans, such as inulin and graminin; polymannosans, polygalactosans, and also mixed polysaccharides, such as hemicelluloses, and polyxylosans or polyarabinosans.

Preferred starting products are cellulose and derivatives thereof, starch and dextrins, particular preference being attributed to cellulose, methyl cellulose, ethyl cellulose, hydroxyethyl cellulose, hydroxypropyl cellulose, carboxymethyl cellulose and salts thereof and starch.

The solubility of the ammonium polysaccharides according to the invention in alcohols or water depends both upon the starting material, upon the degree of substitution and upon the degree of quaternization and may be adjusted as required.

The viscosity stages of the products may be adjusted through the choice of the polysaccharides which have a corresponding average degree of polymerization. Low-viscosity products can be produced by using polysaccharides oxidatively or hydrolytically degraded by standard methods.

The polysaccharides are alkalized for etherification. The alkalization of the polysaccharides and their subsequent etherification may be carried out in the presence of organic solvents. Suitable organic solvents are lower alcohols which preferably contain 2 to 4 carbon atoms per molecule, ethers preferably containing 2 to 4 carbon atoms, hydrocarbons and dipolar aprotic solvents, such as for example dimethyl acetamide or dimethyl sulfoxide, or mixtures of these solvents. For alkalization, the polysaccharides are preferably sprayed with sodium hydroxide in a concentration of 18 to 100% by weight and preferably 40 to 50% by weight. The quantity of sodium hydroxide used depends upon the desired degree of quaternization. According to the invention, the etherification reagent (II) is preferably added either before the sodium hydroxide or after the alkalization phase. For etherification, the reaction mixture is heated to temperatures of 50° to 100° C. and preferably to temperatures of 70° to 90° C. and the temperature level established is maintained until the reaction is complete. The etherification times are between 1 and 15 h, depending on the temperatures and the solvent.

The reaction product is worked up in known manner by separation and washing with aqueous organic solvents.

The water-soluble cationic polysaccharides according to the invention are suitable as additives for hygienic and cosmetic cleansing and care preparations, as auxiliaries in paper manufacture and for the treatment of textile fibers to improve handle.

In addition, the water-soluble cationic polysaccharides are used as aggregating agents. Aggregation in the context of the invention is intended to encompass flocculation, coagulation and precipitation. Flocculating agents are process auxiliaries for rationalizing solid/liquid separation processes. By using flocculating agents, it is possible significantly to increase the sedimentation rate in water of suspended solids which are frequently present in colloidal form. Effective flocculating agents achieve almost complete flocculation of the suspended particles so that the residual solids contents in the liquid phase are largely minimized. In addition, the use of flocculating agents increases the solids content of the solid phase so that the sedimented sludges can be dewatered by machine in a technically and economically favorable manner.

Flocculating agents are divided into primary flocculating agents and flocculation aids. Primary flocculating agents are chemical compounds which form substantially water-insoluble precipitates. They include the Fe, Al and Ca salts widely used in practice. Their addition initially neutralizes the charge of the suspended particles which are generally stabilized by negative surface charges, so that the electrical double layer of the particles is destroyed and rapid coagulation occurs. As hydrolysis of the inorganic compounds progresses, water-saturated voluminous flocs containing water ingredients are formed and precipitate. The disadvantage of flocculation with inexpensive inorganic metal salts is that the flocculation process is dependent on temperature and confined to a narrow pH range, the flocs sediment at a relatively slow rate and large sludge volumes are formed.

Flocculation aids are cationic, anionic or neutral water-soluble polymers of high molecular weight which do not have these disadvantages. By ion and dipole interactions between the polymers and the suspended particles, the colloidal particles initially undergo coagulation in this case, too. Given a sufficiently high molecular weight, the macromolecules are capable of combining several of the destabilized particles to form rapidly sedimenting, shear-stable macroflocs. Flocculation aids are widely used in water treatment and wastewater treatment in the petroleum, paper, coal and ore industries and in certain branches of the chemical industry.

The cationic polysaccharides produced in accordance with the invention may advantageously be used in quantities of 0.01 to 0.5% by weight. Depending on their degree of cationization and their molecular weight, they may be "tailored" for each field of application.

In numerous applications where liquid and semisolid products are produced and stored, microorganisms represent a problem because of their ability to proliferate and their metabolism. At the present time, no methods are available for removing mycotoxins once they have formed from food without destroying the food (H. K. Frank, Schriftenreihe des Bundes für Lebensmittelrecht und Lebensmittelkunde, No. 76, 1974). The water-insoluble cationic polysaccharides produced in accordance with the invention are used in the production of highly active filter materials. For the reasons explained above, these highly active filter materials are of considerable interest in the pharmaceutical industry and in the beverage industry.

The way in which filter layers work is based primarily on
a mechanical sieve effect,
a depth effect
an adsorption effect.

By virtue of the mechanical sieve effect, large particles of sediment are retained on the surface of the layer. They do not penetrate into the pores. Finer sediment particles penetrate more deeply into the layer, become caught up in the material network and gradually clog the pores (depth effect). By virtue essentially of the electrical charge ratios of the sediment particles to the raw materials, the sediment particles which have penetrated into the layer are adsorbed at the surfaces of the pores (adsorption effect). These effects are dependent on the material properties of the raw materials (kieselguhr, cellulose, cotton). The effectiveness of a filter layer is defined by the cleanness with which it clarifies and is determined by a combination of the sieve, depth and adsorption effects.

In germ filtration, conventional filter layers show inadequate cleanness of clarification because of their inadequate adsorption capacity.

In germ filtration tests, test filters in which the raw material cellulose was partly replaced by the cationic polysaccharides according to the invention showed enhanced activity against pyrogenic germs and endotoxins as fibrous filters or aluminium-oxide-filled filter layers.

EXAMPLES

Example 1

226 g (2.0 mol) chloroacetic acid chloride are rapidly added dropwise with stirring at 0° to 5° C. to a solution of 209 g (2.05 mol) N,N-dimethylamino-1,3-propylamine in 300 g isopropanol. 252 g (2.0 mol) dimethyl sulfate are added dropwise to this solution over a period of 30 minutes at 0° to 5° C., followed by the dropwise addition over a period of 1 hour at 9° to 10° C. of 80 g sodium hydroxide in the form of a 50% aqueous solution. After slow heating to 50° C., the reaction mixture is kept at that temperature for 3 to 5 hours. The salt precipitated is filtered under suction, washed with isopropanol and dried: 112 g, corresponding to 95% of the theoretical yield.

Concentration of the combined filtrates by evaporation gives a light brown oil; 553 g, corresponding to 97% of the theoretical yield.

The analytical data correspond to the structure:

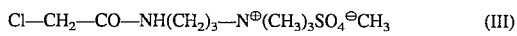

$$Cl-CH_2-CO-NH(CH_2)_3-N^{\oplus}(CH_3)_3SO_4^{\ominus}CH_3 \quad \text{(III)}$$

| Elemental analysis: | C | N | Cl | S |
|---|---|---|---|---|
| Calc. % | 35.5 | 9.2 | 11.9 | 10.5 |
| Found % | 35.0 | 9.1 | 11.3 | 10.5 |

Molecular weight as determined by vapor pressure osmosis in DMF: 320 (calc. 304).

Example 2

16.2 g (0.1 mol) finely ground cotton linters are suspended in 300 ml dioxane and alkalized for 1 h at room temperature with 18% NaOH. 30.5 g (0.1 mol) of the quaternizing reagent III are then added to the alkali cellulose. The temperature is slowly increased to 50° C. and kept at that level for 120 minutes. After cooling, the reaction product is neutralized with acetic acid, purified with 70% methanol and dried. A water-insoluble cationized cellulose ether having an N-content of 2.5%, corresponding to a DS of 0.2, based on the cationized group, is obtained. The IR spectrum shows a strong amide band at 1,550 $cm^{-1}$ and 1,670 $cm^{-1}$.

Example 3

27 g of a hydroxy ethyl cellulose (HEC) having a molar degree of substitution of 2.4 are suspended in 300 ml DMSO/toluene (1:1) and alkalized for 1 h at room temperature with 4.8 g NaOH (prills). 30.5 g (0.1 mol) of the quaternizing reagent III are then introduced into the reaction vessel. The temperature is slowly increased to 90° C. and kept at that level for 8 h. After cooling, the reaction product is neutralized with nitric acid and purified with 80% acetone. A water-soluble, cationized HEC containing 4.6% nitrogen, corresponding to a DS of 0.78, is obtained. The chemicals yield, based on the etherifying agent, is 78%. The IR spectrum again shows the strong amide bands.

Example 4

18.9 g of a methyl hydroxyethyl cellulose (MHEC) having an average degree of substitution, based on methyl, of 1.48 and a molar degree of substitution, based on hydroxyethyl, of 0.13 are suspended in 300 ml dimethyl acetamide/cyclohexane (1:1) and alkalized for 1 h at room temperature with 4.8 g NaOH (prills). 30.5 g (0.1 mol) of quaternizing reagent III are then introduced into the reaction vessel. The temperature is increased slowly to 70° C. and kept at that level for 8 h. After cooling, the reaction product is neutralized with nitric acid and purified with 80% acetone. A water-soluble, cationized MHEC containing 3.4% nitrogen, corresponding to a DS of 0.35, based on the quaternized group, is obtained. The IR spectrum again shows the strong amide bands.

Example 5

23.3 g (0.1 mol) of a carboxymethyl cellulose (CMC) having an average degree of substitution, based on the carboxymethyl group, of 0.9 are suspended in 300 ml dimethyl sulfoxide and the suspension is alkalized for 1 h at room temperature with 0.1 mol 50% NaOH. 30.5 g (0.1 mol) of quaternizing reagent III are then added. The temperature is slowly increased to 90° C. and kept at that level for 10 h. After cooling, the reaction product is neutralized with acetic acid, washed with 70% methanol and dried. A cationized CMC containing 4.1% nitrogen, corresponding to a DS of 0.55, based on the cationic group, is obtained. The chemicals yield is thus 55%. In addition to the carboxylate band at 1,610 cm$^{-1}$, the IR spectrum shows the amide bands at 1,670 cm$^{-1}$ and 1,550 cm$^{-1}$.

Comparison Example (Corresponding to DE-PS 3 820 031)

a) Esterification of the carboxymethyl cellulose

As in Example 1a), 228.4 g (1 mol) sodium carboxymethyl cellulose having a degree of modification of 0.84, viscosity of a 2% aqueous solution 546 mPa.s (rotational viscosimeter), pH value 7.5, and 403.6 g methyl chloride are heated for 9 h at 80° C. in a 2 liter laboratory autoclave. A pressure of approximately 25 bar is established. The methyl chloride is then evaporated in vacuo at 50° C. The IR spectrum of reaction product shows that there is no longer any carboxylate band at 1,610 cm$^{-1}$. Instead, a new band has appeared at 1,750 cm$^{-1}$.

The product is insoluble in water, the supernatant solution having a pH value of 3.4.

b) Aminolysis of the CMC ester

As in Example 2b), 100 g of the reaction product obtained in accordance with a), 80 g dimethyl aminopropyl amine and 330 g methanol are heated with stirring for 3 h to 140° C. in a 2 liter laboratory autoclave, filtered under suction after cooling and washed with aqueous methanol until neutral.

In addition to the expected amide bands at 1.550 cm$^{-1}$ and 1,670 cm$^{-1}$, the IR spectrum of the reaction product shows an equally large carboxylate band at 1,610 cm$^{-1}$. The carbonyl band at 1,750 cm$^{-1}$ has disappeared.

A 2% aqueous solution of the aminolysis product has a viscosity, as measured with a rotational viscosimeter, of 16 mPa.s.

c) Quaternization of the aminolysis product

As in Example 3a), 30 g of the reaction product from b), 50 g methyl chloride and 480 ml methanol are kept at room temperature for 15 h in a 2 liter laboratory autoclave. After cooling, the excess methyl chloride is removed by evaporation, the methanol is filtered off under suction and dried.

The IR spectrum is identical with the product of step b; no Cl$^-$ can be detected.

Under these reaction conditions, no quaternization takes place.

If the reaction is carried out over a period of 4 hours at 80° C., a water-insoluble product is obtained. The supernatant solution has a pH value of 2.5.

The IR spectrum shows the following bands:

1,750 cm$^{-1}$ (main band, —COOH, —OCOOMe)
1,670 cm$^{-1}$, 1,550 cm$^{-1}$ (amide bands)
1,610 cm$^{-1}$ (—COO$^\ominus$Na$^\oplus$)

We claim:

1. A process for the production of polysaccharides corresponding to recurrent formula (I)

comprising reacting of polysaccharides with an alkyl halide corresponding to formula (II)

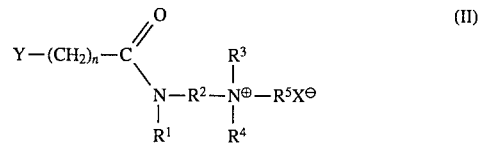

in which

S is a monosaccharide unit and

B is a group of formula (Ia) attached to the monosaccharide unit S by an O atom

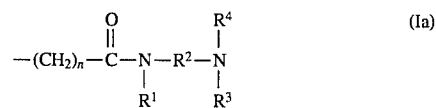

n=an integer of 1 to 6,

R$^1$=H, C$_{1-4}$ alkyl,

R$^2$=an alkylene radical which may interrupted by an O or N atom,

R$^3$,R$^4$=an alkyl, aralkyl or aryl radical, an alkyl radical which may be interrupted by a heteroatom, m=a number of 0.05 to 3.0, R$^5$=an alkyl radical optionally containing an olefinic double bond or an O atom or an aralkyl radical, Y=Cl, Br, X$^\ominus$=an anion or R$^3$ and R$^4$ together with the common N atom form a ring optionally containing another heteroatom.

2. A process as claimed in claim 1, characterized in that

R$^1$=H, CH$_3$

R$^2$=—CH$_2$CH$_2$—, —(CH$_2$)$_3$—, —(CH$_2$)$_4$—, —(CH$_2$)$_6$—,

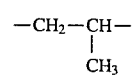

—(CH$_2$)$_3$—O—(CH$_2$)$_2$—, —(CH$_2$)$_2$—O—(CH$_2$)$_2$—,

R$^3$,R$^4$=CH$_3$, CH$_2$CH$_2$OH, CH$_2$CH$_3$, CH$_2$CH$_2$OCH$_3$ or

R$^3$,R$^4$ together with N atom form the group

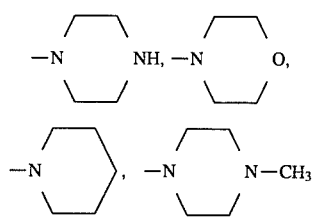

$R^5$=$CH_3$, $CH_2CH_3$, $CH_2$—$CH$=$CH_2$,

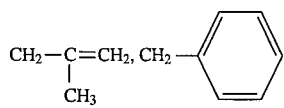

$CH_2$—$CH_2OH$ $X^\ominus$=$Cl^\ominus$, $Br^\ominus$, $SO_4Me^\ominus$, $SO_4Et^\ominus$ toluene sulfonate, methane sulfonate, phosphate, sulfate.

3. A process as claimed in claim 1, characterized in that
$R^1$=H,
$R^2$=—$(CH_2)_2$—, —$(CH_2)_3$—,
$R^3, R^4$=$CH_3$, $CH_2CH_3$
$R^5$=$CH_3$, $CH_2$—$CH$=$CH_2$,

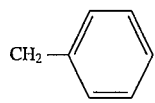

$CH_2CH_2OH$, $CH_2CH_3$, $X^\ominus$=$Cl^\ominus$, $SO_4Me^\ominus$, $SO_4Et^\ominus$.

4. A process as claimed in claim 1 for the production of polysaccharides, characterized in that an alkalized polysaccharide is etherified.

5. A process as claimed in claim 1 for the production of polysaccharides, characterized in that S is cellulose or a cellulose derivative.

6. A process as claimed in claim 1 for the production of polysaccharides, characterized in that S is cellulose, hydroxyethyl cellulose, hydroxypropyl cellulose, methyl hydroxyethyl cellulose or carboxymethyl cellulose.

7. A process as claimed in claim 1 for the production of polysaccharides, characterized in that the polysaccharide corresponding to formula (I) has a nitrogen content of at least 0.3% by weight.

* * * * *